United States Patent [19]

Tsai

[11] Patent Number: 5,797,440

[45] Date of Patent: Aug. 25, 1998

[54] PARTITION FRAMEWORK FOR DIVIDING A SPACE INTO SMALL COMPARTMENTS

[76] Inventor: Chi-Cheng Tsai, No. 9, Kungyeh North $3^{rd}$., Nankang Ind. Zone, Nantou, Taiwan

[21] Appl. No.: 752,083

[22] Filed: Nov. 19, 1996

[51] Int. Cl.$^6$ ....................................................... A47G 5/00
[52] U.S. Cl. ......................... 160/135; 52/282.5; 52/584.1; 403/381; 403/387
[58] Field of Search ........................... 160/135, 351; 52/584.1, 282.4, 282.5; 403/381, 384, 387

[56] References Cited

U.S. PATENT DOCUMENTS

| 3,605,851 | 9/1971 | Miles et al. ............................. | 160/135 |
| 4,129,163 | 12/1978 | Johnson ................................. | 160/135 |

FOREIGN PATENT DOCUMENTS

| 743259 | 1/1956 | United Kingdom ................ | 52/584.1 |
| 769453 | 3/1957 | United Kingdom ................ | 52/584.1 |

Primary Examiner—Blair Johnson
Attorney, Agent, or Firm—W. Wayne Liauh

[57] ABSTRACT

A partition framework for dividing a space into small compartments is composed of a plurality of frame parts having an upright support, a plurality of connection heads, and at least one connect in column. The upright support is provided with a plurality of fastening holes and through holes. The connection heads have a base, a hollow projection and a stepped hollow projection. The connection column is provided with at least two slide slots extending along the direction of the longitudinal axis of the connection column. The slide slots of the connection column are engageable with the base of the connection heads for fastening the upright supports of the frame parts with the connection heads such that each support frame is secured to the connect in column by a fastening screw engaging the screw hole of the base and one of the through holes of the upright support, and that the hollow projection and the stepped hollow projection of the connection head are received in the fastening holes of the upright support, and further that the frame parts form therebetween a predetermined angle.

2 Claims, 13 Drawing Sheets

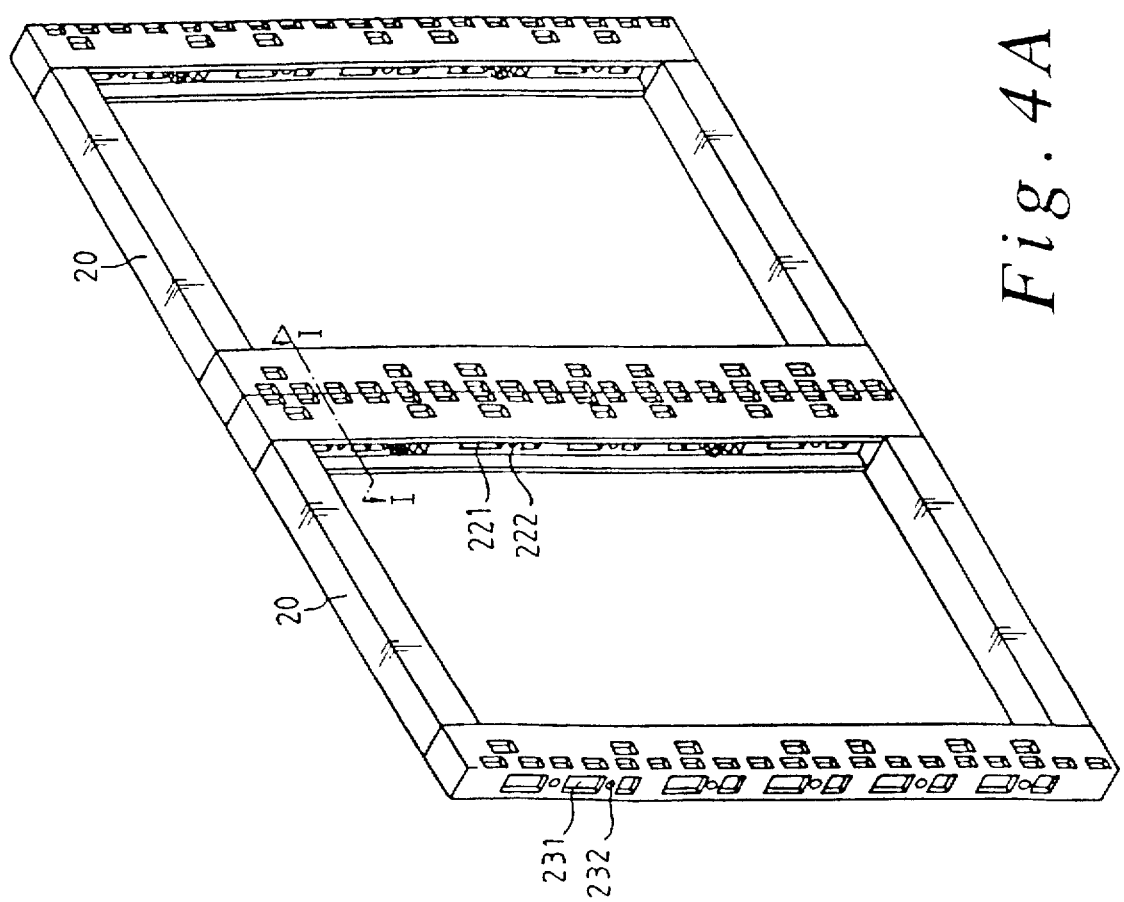

I - I $\underline{J-J}$

K-K

PARTITION FRAMEWORK FOR DIVIDING A SPACE INTO SMALL COMPARTMENTS

FIELD OF THE INVENTION

The present invention relates to a partition framework for dividing a space into small compartments so as to maximize the economic utilization of the space.

BACKGROUND OF THE INVENTION

The partition panels are often used to divide an office area into cubicles for providing the office workers with a certain degree of privacy as well as a personalized work environment.

As shown in FIG. 1, a partition framework of the prior art comprises four frame parts 11, 12, 13 and 14, which are fastened securely by a fastening piece 10 in conjunction with a plurality of bolts A. The partition framework is of a cruciform construction. Another prior art partition framework is shown schematically in FIG. 2 and is composed of two frame parts 15 and 16, which are held together by an L-shaped fastening piece 17 along with a plurality of bolts A such that the two frame parts 15 and 16 are perpendicular to each other. An ornamental piece 18 is fastened to the outer side surface of a part where the frame parts 15 and 16 meet.

Such prior art partition frameworks as described above are defective in design in that they make use of the fastening pieces 10 and 17 of various shapes, and a plurality of fastening bolts, and that they are therefore not cost-effective. Furthermore, the second prior art partition framework comprises an arcuate ornamental piece 18, which requires additional cost and labor.

SUMMARY OF THE INVENTION

It is therefore the primary objective of the present invention to provide an improved partition framework which is free from the shortcomings of the prior art partition frameworks.

The partition framework of the present invention comprises a plurality of frame parts having an upright support. The upright support is provided respectively in the inner side thereof and the outer side thereof with a plurality of fastening holes and through holes. The upright supports of the frame parts are held securely together by two connection heads. The connection heads are provided respectively with a hollow projection and a hollow stepped projection such that the hollow projection of one of the two connection heads is corresponding in location to and engageable with the stepped projection of another one of the two connection heads, and that the stepped projection of one of the two connection heads is corresponding in location to and engageable with the hollow projection of another one of the two connection heads. In addition, the connection heads are provided respectively with a screw hole. The upright supports of two frame parts are held securely together by the connection heads which are fastened with the upright supports by a fastening screw engaging the screw holes of the connection heads. Two connection heads are engaged with each other such that the hollow projection of one of the two connection heads is engaged with the stepped projection of another one of the two connection heads, and that the stepped projection of one of the two connection heads is engaged with the hollow projection of another one of the two connection heads. The stepped projections and the hollow projections of the two connection heads are received in the fastening holes of the upright supports of the frame parts, whereas the fastening screw is received in the through holes of the upright supports of the frame parts.

The foregoing objective, features, functions, and advantages of the present invention will be more readily understood upon a thoughtful deliberation of the following detailed description of the embodiments of the present invention in conjunction with the accompanying drawings.

DETAILED DESCRIPTION OF THE EMBODIMENTS

Figure 1:
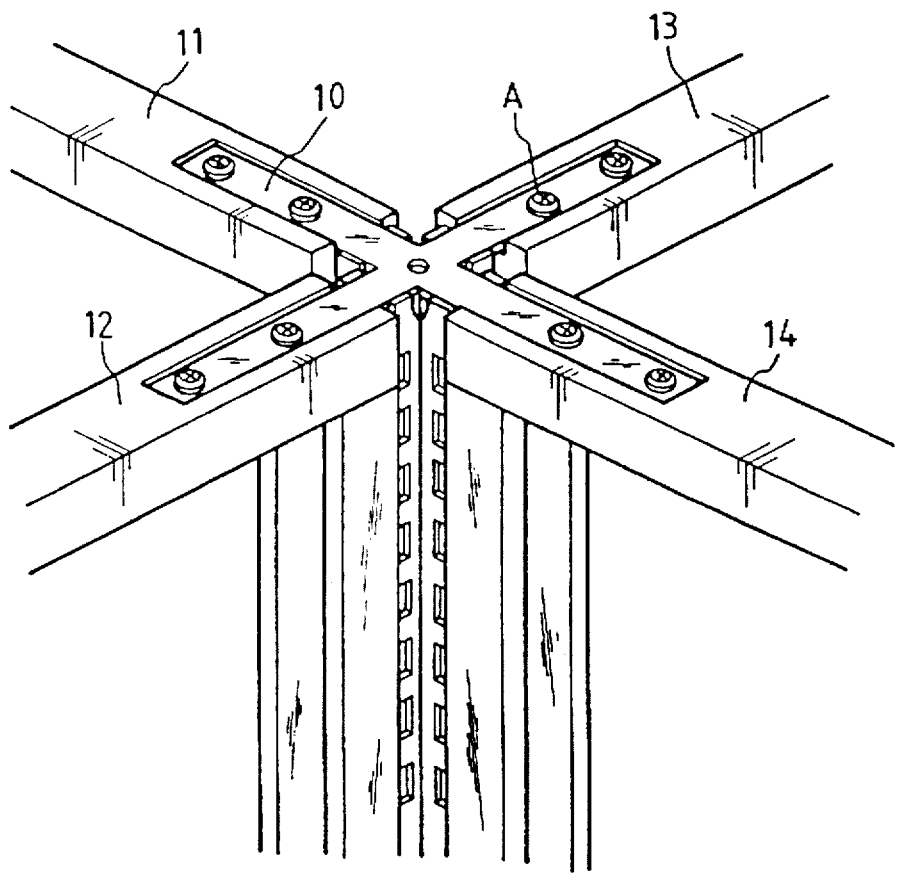
FIG. 1 shows a schematic view of a partition framework of the prior art.
Figure 2:
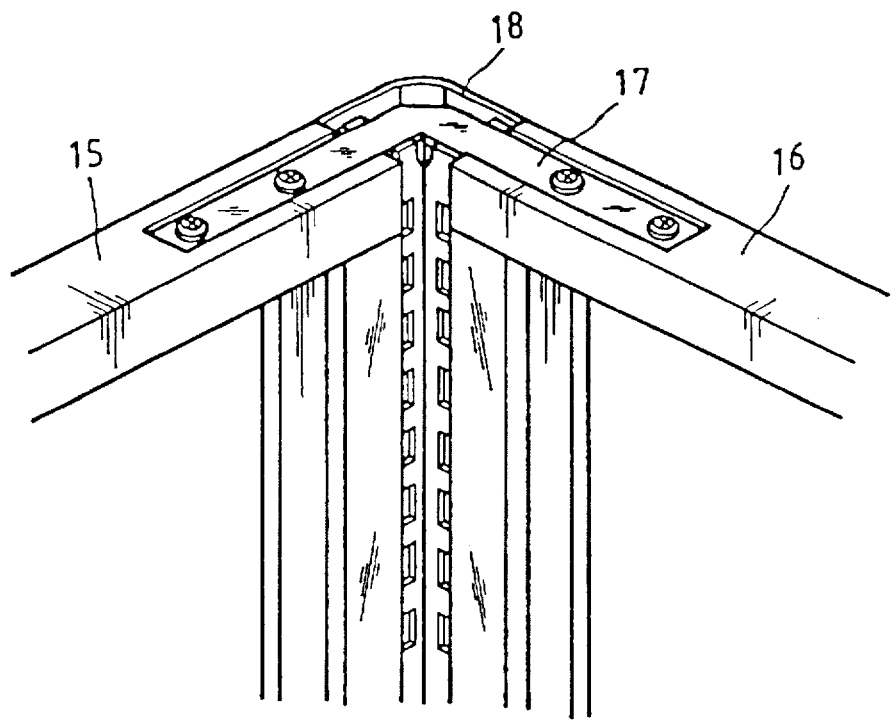
FIG. 2 shows another schematic view of the partition framework of the prior art.
Figure 3:
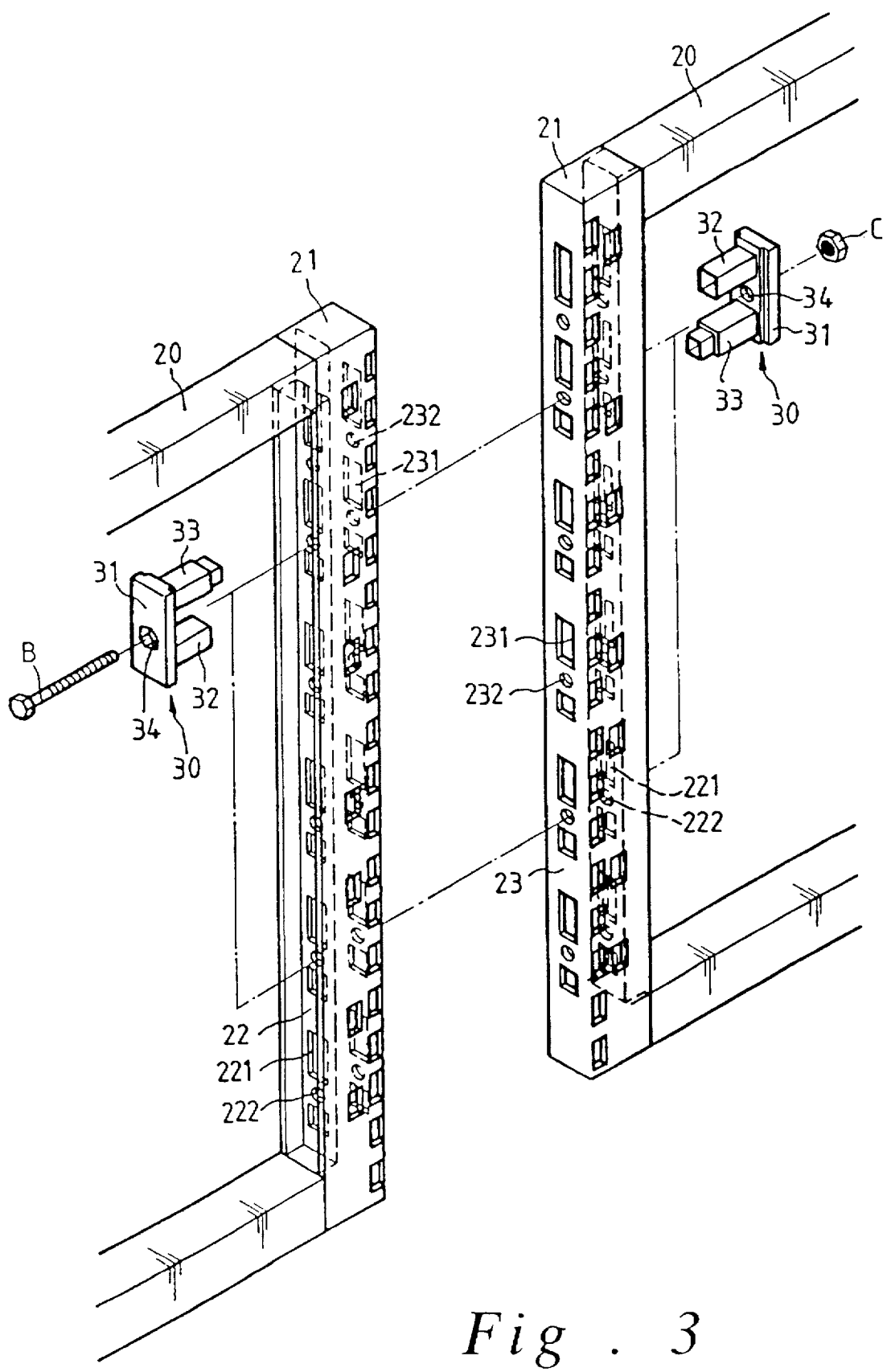
FIG. 3 shows an exploded view of the present invention.

As shown in FIG. 3, a partition framework of the present invention comprises a plurality of frame parts 20 having an upright support 21. The upright support 21 is provided in an inner side 22 and an outer side 23 thereof with a plurality of fastening holes 221 and 231, and with a plurality of through holes 222 and 232. The upright supports 21 of the frame parts 20 are held together securely by a plurality of connection heads 30. Each of the connection heads 30 comprises a base 31, a hollow projection 32 perpendicular to the base 31, and a stepped hollow projection 33 perpendicular to the base 31. The base 31 has a screw hole 34 located between the hollow projection 32 and the stepped hollow projection 33.

Figure 4B:
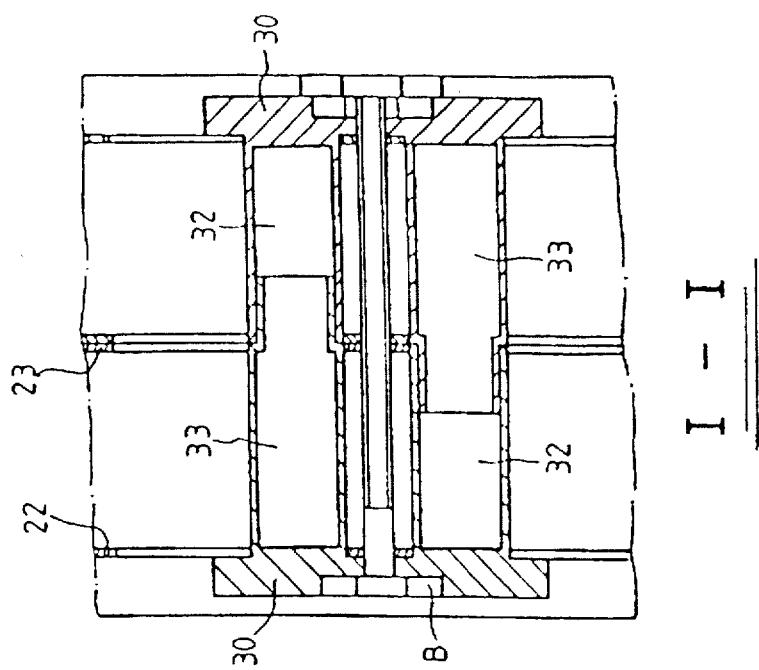
FIG. 4 shows a schematic view of the present invention in combination.

As shown in FIG. 4, the upright supports 21 of the frame parts 20 are held together by the connection heads 30 which are fastened with the upright supports 21 by a fastening screw B engaging the screw holes 34 of the bases 31 of the connection heads 30. Two connection heads 30 are engaged with each other such that the hollow projection 32 of one of the two connection heads 30 is engaged with the stepped projection 33 of another one of the two connection heads 30, and that the stepped projection 33 of one of the two connection heads 30 is engaged with the hollow projection 32 of another one of the two connection heads 30. In the meantime, the stepped projections 33 and the hollow projections 32 of the two connection heads 30 are received in the fastening holes 221 and 231 of the upright supports 21, whereas the fastening screw B is received in the through holes 222 and 232. The fastening screw B is provided with a nut C. Two frame parts 20 of the partition framework of the present invention are joined together linearly, as shown in FIG. 4.

Figure 5A:
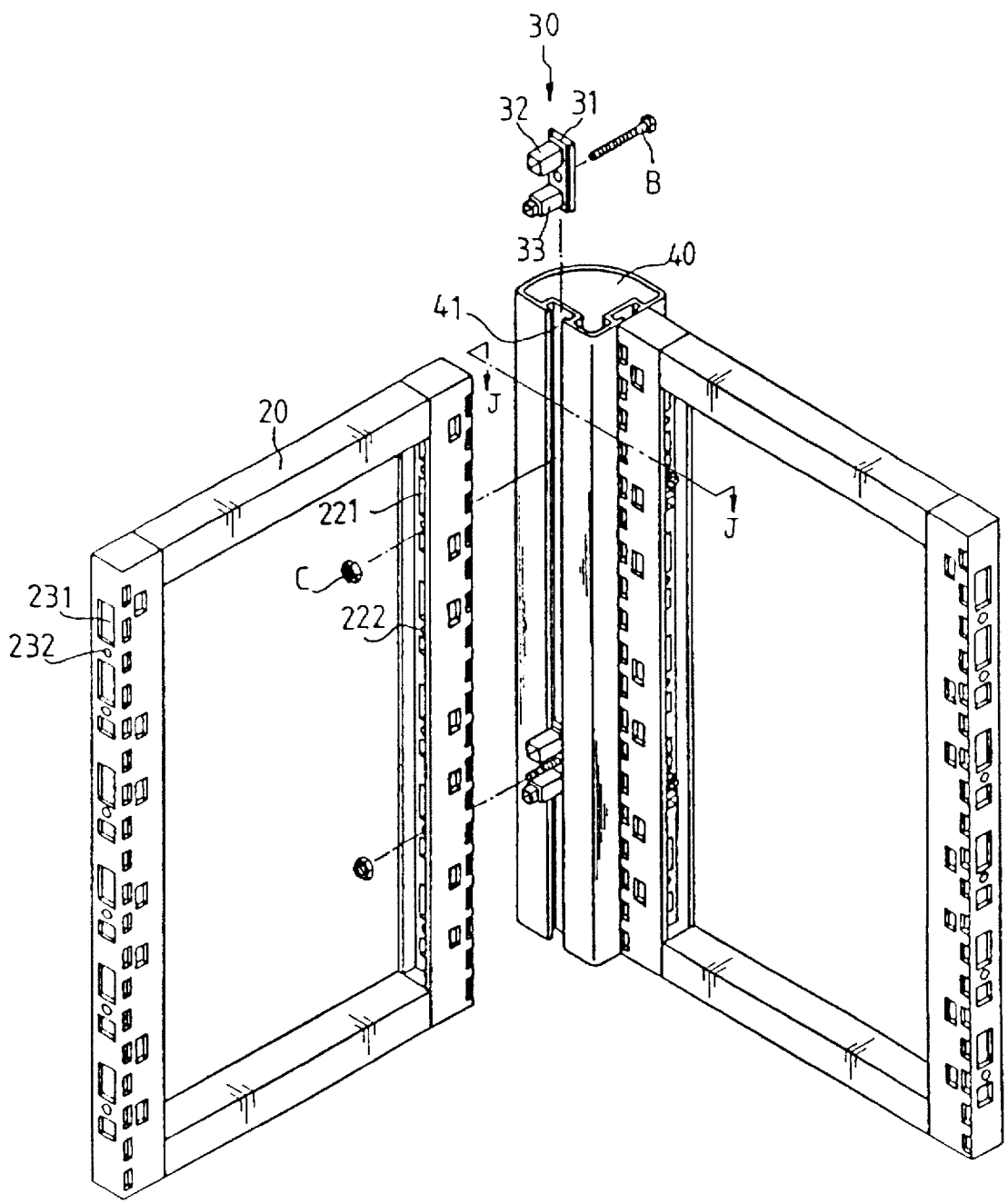
FIG. 5 shows a schematic view of a first preferred embodiment of the present invention.
Figure 5B:
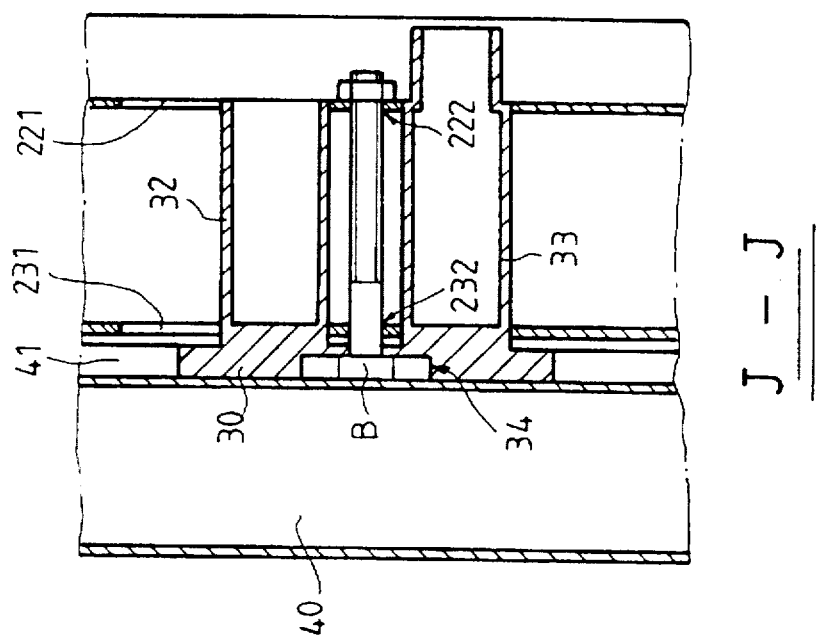

As shown in FIG. 5, two frame parts 20 of the present invention are held together to form the partition framework such that the two frame parts 20 are perpendicular to each other, and that the two frame parts 20 are held by a connection column 40 which is made integrally with the frame parts 20 and is provided with two slide slots 41 engageable with the base 31 of the connection heads 30. The frame parts 20 are secured to the connection column 40 by the connection heads 30 such that the hollow projections 32 and the stepped projections 33 of the connection heads 30 are received in the fastening holes 231 and 221, and that the fastening screws B are received in the screw holes 34 and the through holes 232 and 222.

Figure 6A:
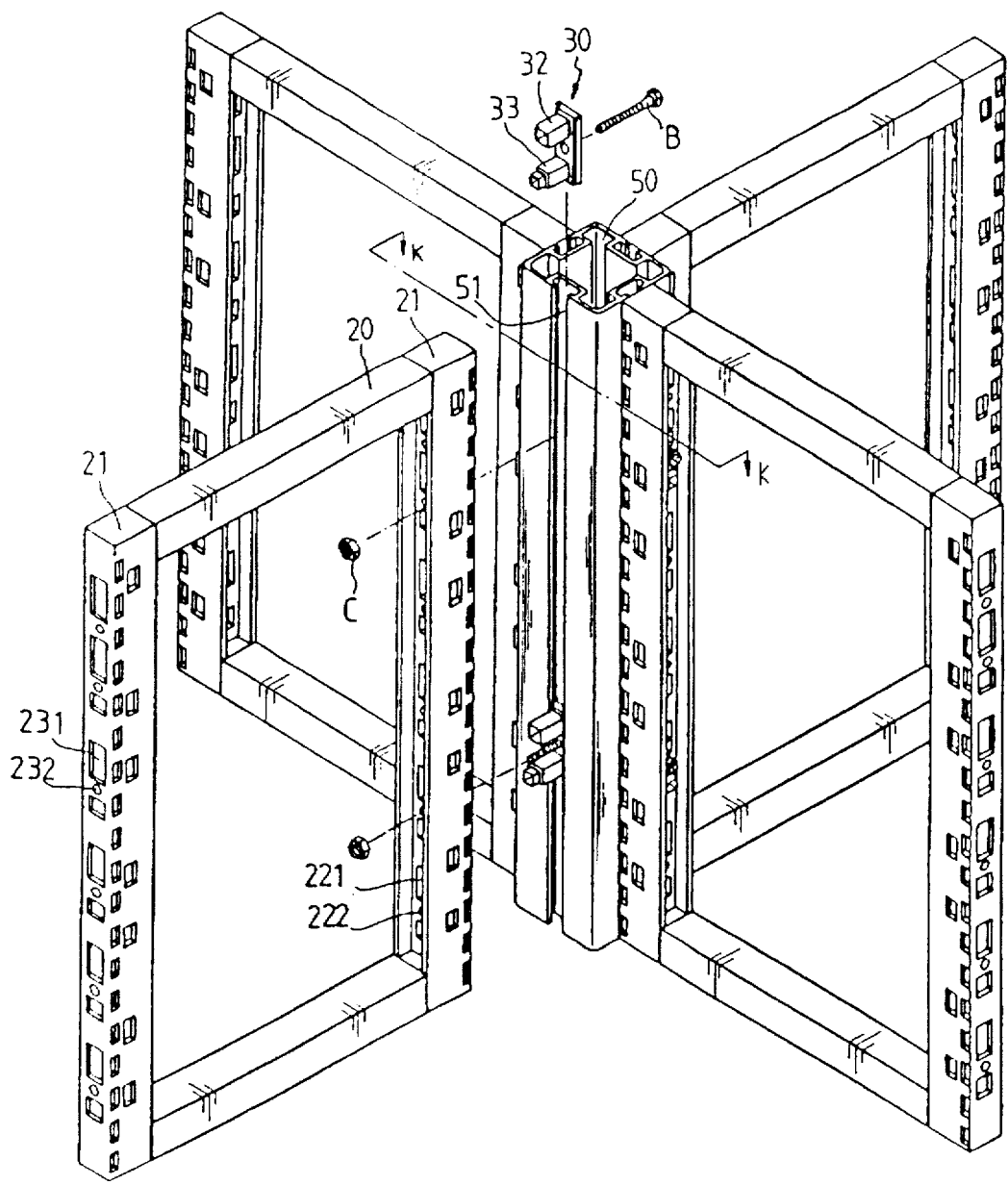
FIG. 6 shows a schematic view of a second preferred embodiment of the present invention.
Figure 6B:
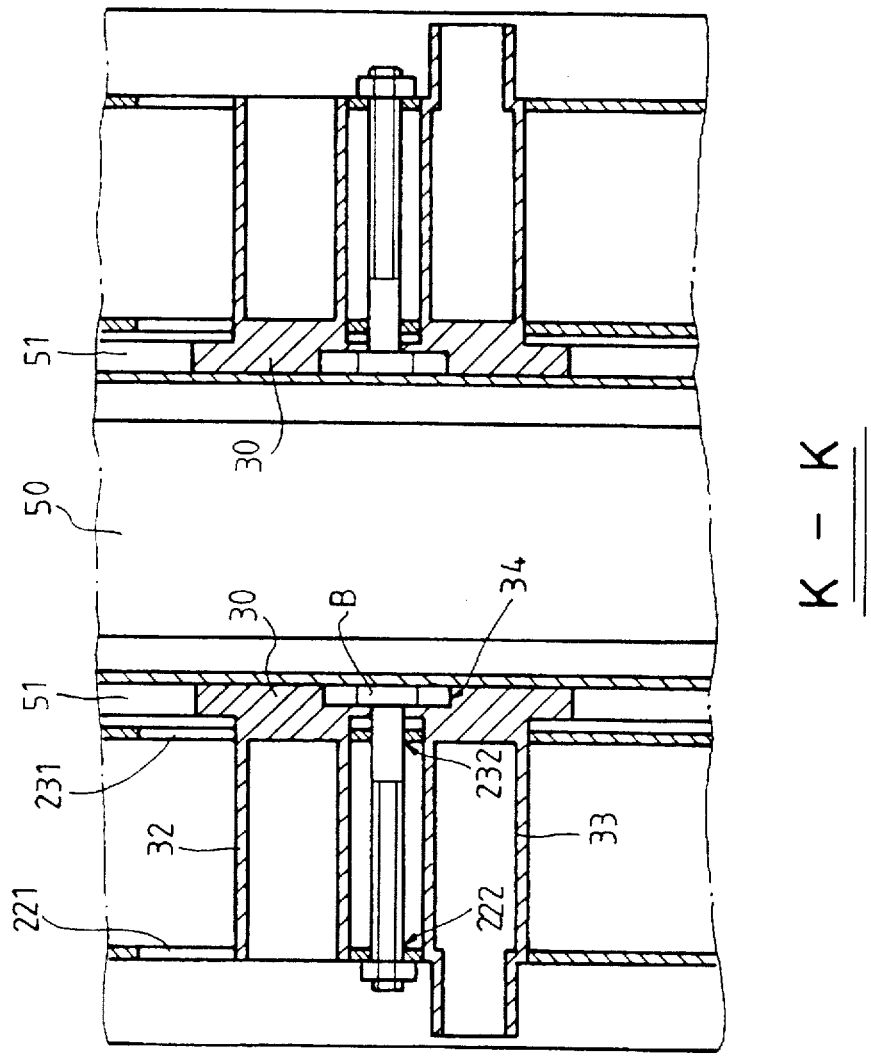

As illustrated in FIG. 6, the partition framework of the present invention comprises four frame parts 20, which are held together by a connection column 50 having four slide slots 51 engageable with the base 31 of the connection heads 30. The method for fastening the frame parts 20 with the connection column 50 by the connection heads 30 is similar to that described above in conjunction with FIG. 5.

Figure 7A:
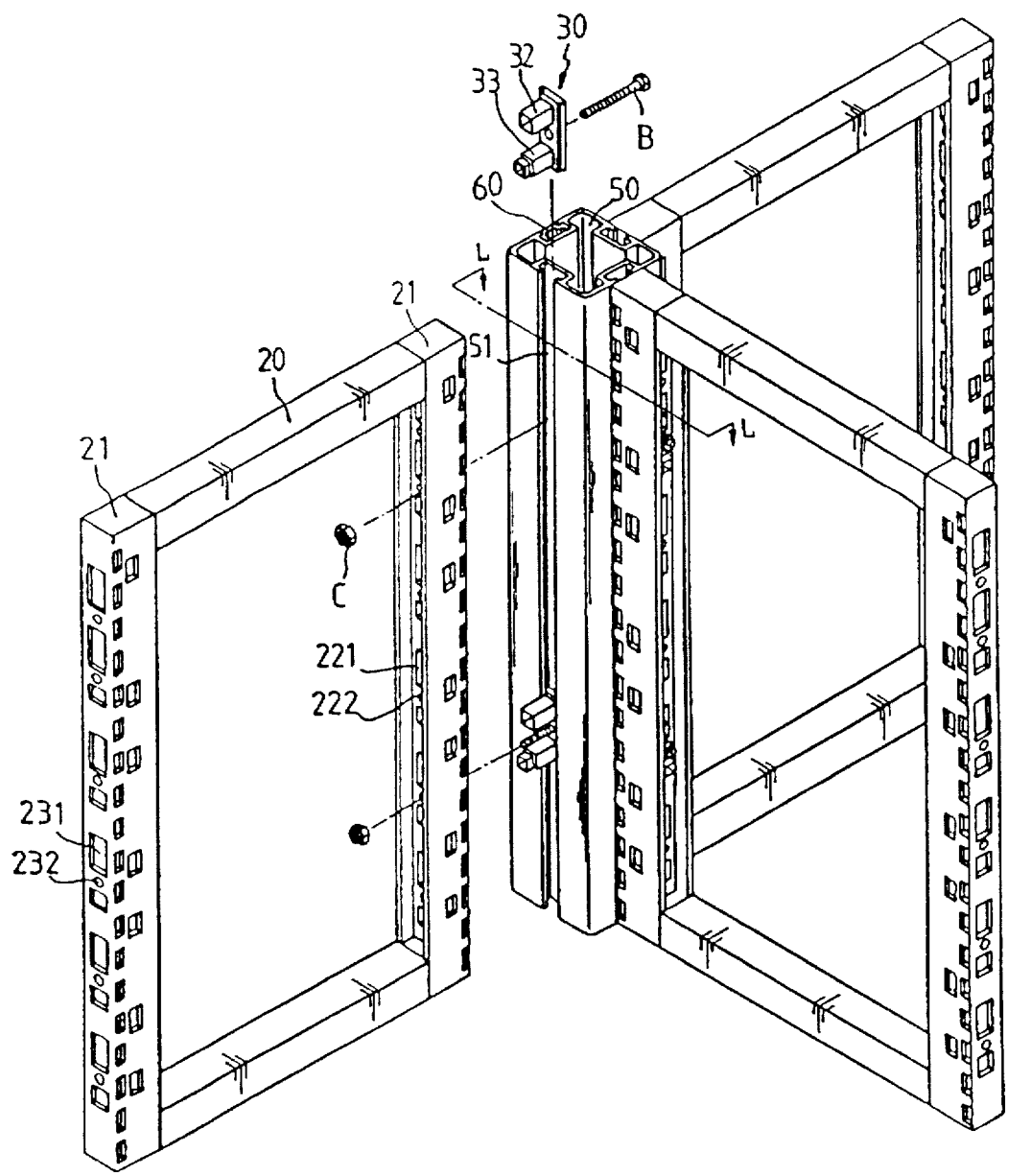
FIG. 7 shows a schematic view of a third preferred embodiment of the present invention.
Figure 7B:
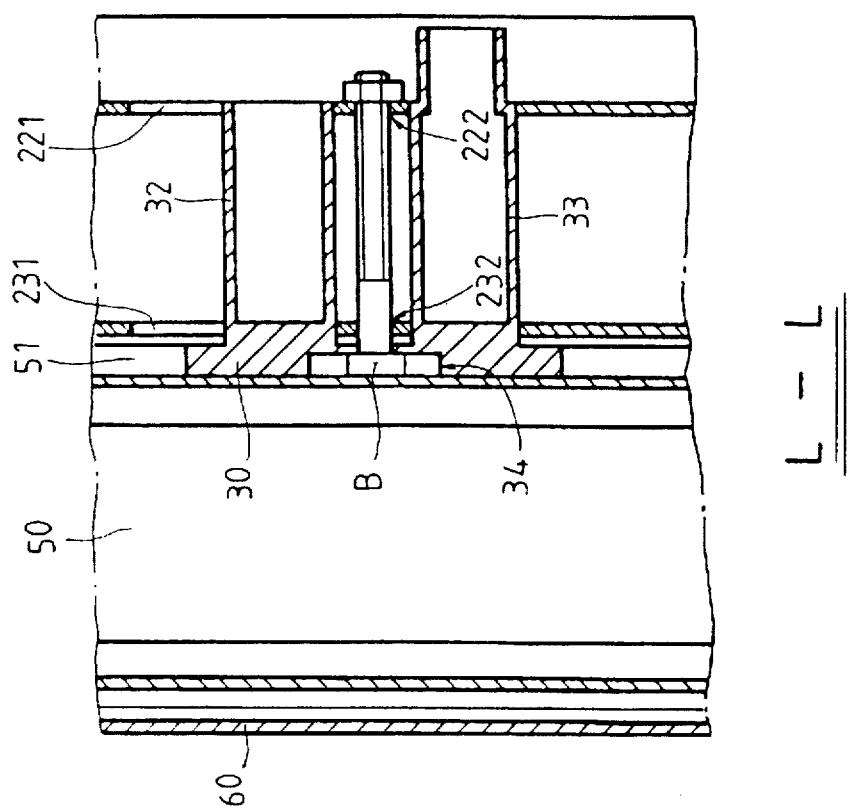
Figure 8A:
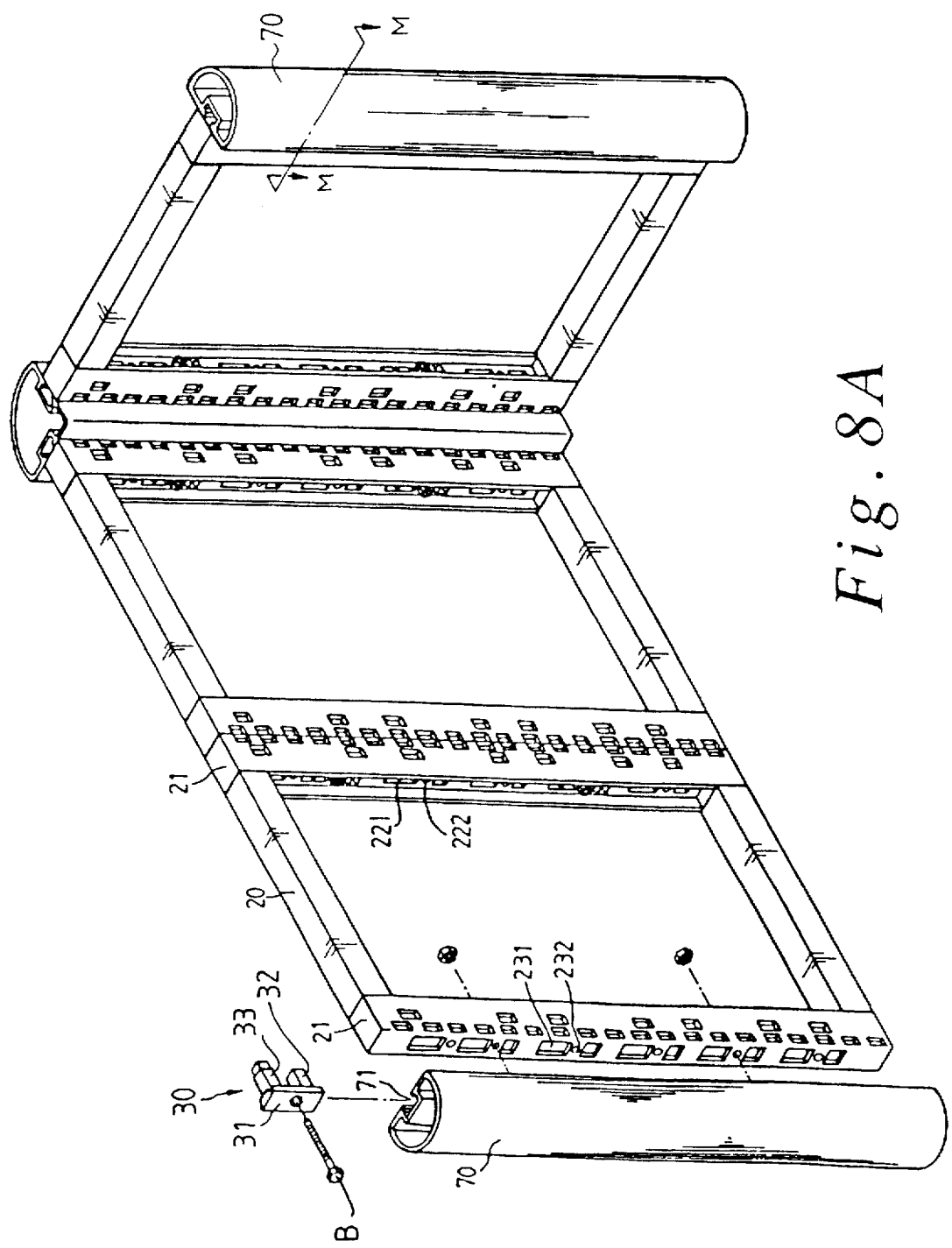
FIG. 8 shows a schematic view of a fourth preferred embodiment of the present invention.
Figure 8B:
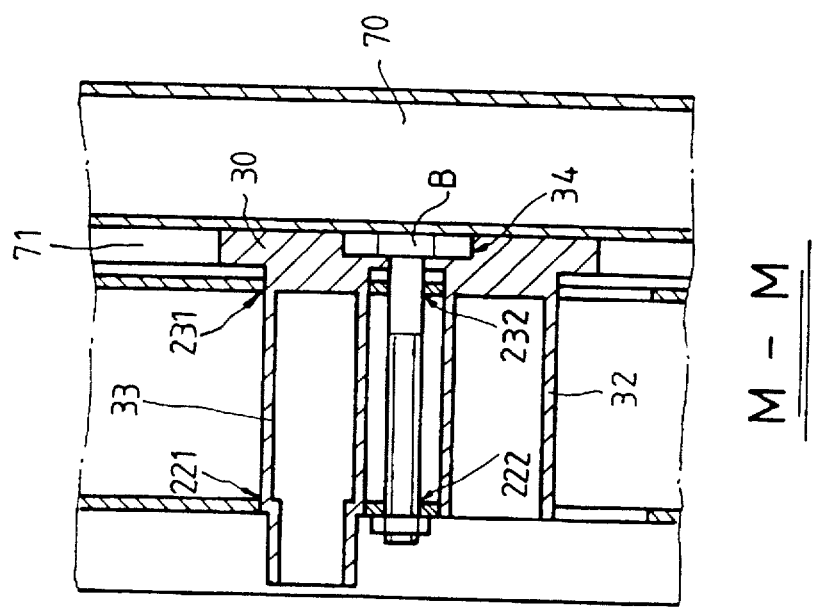

The form of the partition framework of the present invention is variable, as shown in FIG. 7 and 8. Now referring to FIG. 7, the partition framework is made up of three frame parts 20. Two of the three frame parts 20 are coplanar with each other, whereas the remaining frame part 20 is perpendicular to the coplanar frame parts 20. These three frame parts 20 are held together by the connection column 50, with one of the four slide slots 51 being sealed off with an ornamental strip 60.

The partition framework of the present invention shown in FIG. 7 can be modified in such a manner that two frame parts 20 are joined together end to end so as to form one side which is twice longer than another side of the partition framework. In addition, the partition framework is further provided with an end column 70 having a slide slot 71. The end column 70 is similar in construction to the connection column 40 and 50. The end column 70 is joined with the outermost frame part 20 by means of the connection heads 30.

The embodiments of the present invention described above are to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A partition framework comprising:

a plurality of frame parts each having an upright support which is provided with a plurality of fastening holes and through holes;

a plurality of connection heads each comprising a base, a hollow projection perpendicular to said base, and a stepped hollow projection perpendicular to said base and located on an opposite portion of said base from said hollow projection, said base being provided with a screw hole located between said hollow projection and said stepped hollow projection;

said frame parts being joined together by said connection heads in such a manner that each of said connection heads is fastened with adjacent said upright supports with a fastening screw which engages said screw hole of said base of said connection head with respective, said through holes of said adjacent upright supports of said frame parts, and that said hollow projection of one of two connection heads is engaged with said stepped hollow projection of the other, one of said two connection heads via said fastening holes of said adjacent upright supports, and further that said stepped hollow projection of said other said other one of said two connection heads is engaged with said hollow projection of said one of said two connection heads via said fastening holes of said adjacent upright supports.

2. The partition framework as defined in claim 1 further comprising a connection column having a predetermined cross-sectional shape and being provided with at least two slide slots extending along the direction of a longitudinal axis thereof, said slide slots being engageable with said base of said connection heads for fastening said upright supports of said frame parts with said connection column such that some of said support frames are secured to said connection column by a fastening screw engaging said screw hole of said base and one of said through holes one of said upright supports, and that said hollow projection and said stepped hollow projection of said connection head are received in said fastening holes of said upright support, and further that said frame parts from therebetween a predetermined angle.

* * * * *